(12) United States Patent
Lent (10) Patent No.: US 7,146,248 B2
(45) Date of Patent: Dec. 5, 2006

(54) AUTOMATED MINERAL PROCESSING SYSTEMS AND METHODS

(76) Inventor: John H. Lent, P.O. Box 1037, Edgewood, NM (US) 87015

( * ) Notice: Subject to any disclaimer, the term of this patent is extended or adjusted under 35 U.S.C. 154(b) by 122 days.

(21) Appl. No.: 10/983,190

(22) Filed: Nov. 5, 2004

(65) Prior Publication Data

US 2005/0102061 A1   May 12, 2005

Related U.S. Application Data

(60) Provisional application No. 60/518,440, filed on Nov. 7, 2003.

(51) Int. Cl.
*G06F 19/00* (2006.01)
(52) U.S. Cl. ............... 700/245; 700/254; 700/259; 156/345.1; 318/568.1
(58) Field of Classification Search ............... 700/245, 700/254, 259; 156/345.1; 318/568.1
See application file for complete search history.

(56) References Cited

U.S. PATENT DOCUMENTS

| | | | | |
|---|---|---|---|---|
| 6,514,129 | B1 * | 2/2003 | Halley | 451/291 |
| 6,741,912 | B1 * | 5/2004 | Olesen et al. | 700/248 |
| 6,855,030 | B1 * | 2/2005 | Halley | 451/5 |
| 6,859,683 | B1 * | 2/2005 | Parker et al. | 700/259 |
| 6,889,119 | B1 * | 5/2005 | Riff et al. | 700/254 |
| 6,932,557 | B1 * | 8/2005 | Downs et al. | 414/741 |
| 6,934,605 | B1 * | 8/2005 | Dothan et al. | 700/245 |
| 6,934,606 | B1 * | 8/2005 | Genetti et al. | 700/254 |
| 2002/0090320 | A1 * | 7/2002 | Burow et al. | 422/64 |
| 2004/0048550 | A1 * | 3/2004 | Halley | 451/5 |
| 2005/0034809 | A1 * | 2/2005 | Woodruff et al. | 156/345.1 |
| 2005/0058574 | A1 * | 3/2005 | Bysouth et al. | 422/63 |

OTHER PUBLICATIONS

Suckau et al., Automation of MALDI-TOF analysis for proteomics, 1999, Internet, p. 1-5.*
Cheng et al., Adaptive synchronizaton control of a robotic manipulator operating in an intelligen workcell, 1990, IEEE, p. 119-126.*

* cited by examiner

*Primary Examiner*—Thomas G. Black
*Assistant Examiner*—McDieunel Marc
(74) *Attorney, Agent, or Firm*—Luis M. Ortiz; Kermit D. Lopez; Ortiz & Lopez, PLLC (57) ABSTRACT

Mineral processing system performs product movement and processing within a secured room using robotics and computerized automation. A heated chemical processing well provides a hot bath wherein raw mineral is submersed into a separating agent. Used separating agent and residual mineral waste can be automatically disposed of at a chemical dumping station. New separating agent can be automatically loaded into hot baths. Crucibles contain separating agent during mineral processing, and can be used to transport waste from the processing station to the dumping station. A mineral basket can transport and contain mineral during processing. Crucibles and baskets can be made of Inconel, stainless steel, or other material suitable for high temperature processing. A lid/cover includes transducers (e.g., thermal, liquid level) for monitoring processing operations within the well. A separating material delivery port and a vent integrated with the lid/cover that can be used to collect and contain harmful vapors.

20 Claims, 9 Drawing Sheets

AUTOMATED MINERAL PROCESSING SYSTEMS AND METHODS

INVENTION PRIORITY

The present invention claims priority to a U.S. Provisional Patent Application Ser. No. 60/518,440, entitled "Automated Mineral Processing Systems and Methods," filed Nov. 7, 2003, which is incorporated by reference herein.

FIELD OF THE INVENTION

The present invention is generally related to mineral processing. More particularly, the present invention is related to mechanically-automated and computer-controlled mineral processing, monitoring and control systems.

BACKGROUND

Electromechanical automation is not new to mining and mineral processing operations. For example, with diamond excavation the process begins with blasting the kimberlite loose. Giant excavators load the rock into very large trucks with tires twice the height of a man. The ratio of diamond to kimberlite is about one million to one, but nevertheless, it is estimated that each truckload can average about $150,000 worth of diamonds. In the processing plant, the kimberlite is crushed into progressively smaller bits. Eventually, the diamonds and crushed kimberlite are whirled in a device similar to large clothes dryers. Because the diamonds are heavier than the rock, they concentrate on the outer edge and are skimmed off. Final separation takes place on a conveyor belt, as the gems and the remaining rock pass under ultraviolet light. The light causes the diamonds to glow, and they are then puffed off the side of the belt with a blast of air.

Although some mineral procedures are automated, the human factor is still employed in what can be considered some of the most harmful steps of processing. For example, diamond processing operations utilize manual human labor to process raw materials in high temperature chemical baths. It is well known that separating agents such as concentrated sodium hydroxide are used for the removal of kimberlite from diamonds. Sodium hydroxide is a powerful caustic that is used in processes wherein temperatures reach more than 500° C. Such heating temperatures obviously cause harmful vapors in processing rooms where separation occurs. Unfortunately a human factor is directly involved in the process of moving raw material contained in stainless steel baskets from in-processing facilities into hot baths of sodium hydroxide maintained at over 500° C., and then removing the baskets containing processed mineral from the hot baths to out-processing facilities. Furthermore, the sodium hydroxide contained within the baths must be regularly maintained, which entails removal of old sodium hydroxide, cleansing of baths, and replenishing the baths with new sodium hydroxide pallets.

As can be appreciated, human operators are constantly exposed to unreasonable levels of harmful vapors and potentially life threatening circumstances should an accident occur with the processing environment. What is needed are systems and methods that can relieve mineral processing operators of the direct human factor. The present inventor believes that removal of human operators will decrease the potential for human injury, and will also increase process efficiency and overall production levels, thereby translating into increased profits.

It is therefore an objective of the present invention to minimize the direct human factor from harmful mineral processing environments. One of the critical elements of the present invention is the ability of the system to closely control sodium hydroxide, a highly caustic chemical that is generally used in mineral processing. The present invention has many built-in safety features to automatically control and monitor separation agents, such as sodium hydroxide, during mineral processing.

SUMMARY OF THE INVENTION

The automated mineral processing system of the present invention provides complete process safety and product security.

It is a feature of the present invention that all movement of the product is performed within a secured environment (e.g., work cell, panels, rooms) using state of the art robotics. It is also a feature of the present invention that all processes including automation are controlled and monitored by at least one computer. It is also a feature of the invention that all elements of the present process are monitored by the computer and reported to the operator/user.

It is another feature of the present invention that the environment, process and equipment are constantly monitored by computer controlled transducers and most problems can be resolved quickly and easily by the control system, with full reporting to users.

In accordance with features of the present invention, a processing station is described that includes a pre-heater and at least one chemical processing well wherein raw mineral is submersed in a hot bath of separating agent (e.g., sodium hydroxide for diamond processing).

In accordance with another feature of the present invention, a chemical dumping station is described wherein the spent/used separating agent and residual mineral waste automatically disposed.

It is a feature of the present invention that new separating agent can be automatically loaded into hot baths via an automated material loading station operating. For example, sodium hydroxide pellets can automatically be placed into processing wells by the material loading station.

It is another feature of the present invention to include crucibles, wherein a crucible can contain the separating agent during mineral processing and can be used to transport waste from the processing station to the dumping station. The crucible can be made of Inconel, stainless steel, or other material suitable for high temperature processing.

It is another feature of the present invention to include a mineral basket, wherein the mineral basket can transport and contain mineral during processing. Like the crucibles, the baskets can be made of Inconel, stainless steel, or other material suitable for high temperature processing.

It is another feature of the present invention to include a cover (e.g., lid) that can further include transducers (e.g., thermal, liquid level) for monitoring processing operations within the well. It is another feature of the present invention that a separating material delivery port can be integrated with the lid/cover. It is another feature of the present invention that a vent can be integrated with the lid/cover and used to collect and remove harmful vapors.

Operations within the work cell can be controlled and monitored remotely using computers, communications links and observation rooms. Human operators no longer have to be involved in harmful mineral processing operations using the present invention. All products are retained behind secured access panels and only obtained by opening the panels using electronic authentication (e.g., keyless access panels/keypads that are password and/or biometric capable). User, operator, worker authentication provides the maximum amount of security over valuable mined mineral product, e.g., diamonds. Preferably, the system includes a fire suppression system to react in the event of a catastrophic accident and also video monitoring capabilities for increased security and safety monitoring. The system reports and archives the status of all elements of the system, results of which can be displayed using full graphics, during real-time or after-the-fact.

DETAILED DESCRIPTION OF THE INVENTION

It is an objective of the present invention to provide systems and methods to closely control sodium hydroxide, a highly caustic chemical that is generally used in mineral processing. It is well known that concentrated sodium hydroxide is a powerful caustic agent when process temperatures over 500° C. are added. Therefore, handling of chemicals and associated materials requires special attention. The present invention has many built in safety features including automatic control and monitoring of chemicals, such as sodium hydroxide, which is used during mineral processing.

Figure 1:
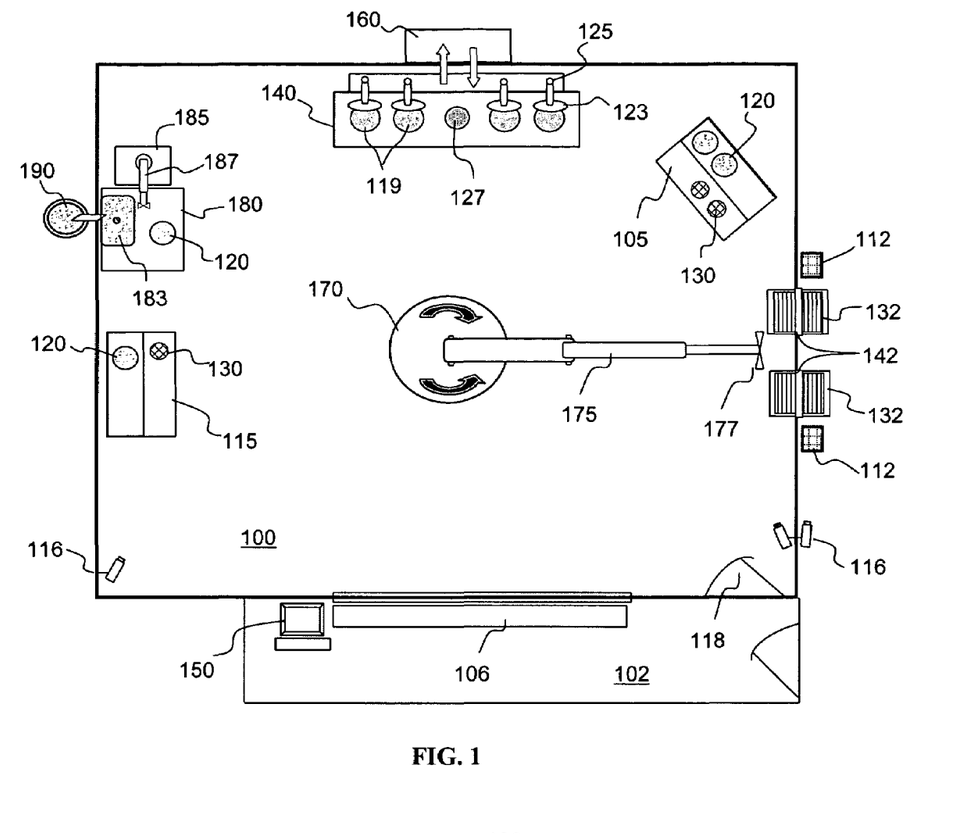
FIG. 1 illustrates a work cell including automated mineral processing equipment.

Referring to FIG. 1, a work cell 100 is illustrated wherein mineral processing in accordance with features of the present invention can be carried out. As shown in FIG. 1, the work cell 100 includes a centralized robotic system 170 that can pivot 360 degrees and includes an extending arm 175 and a mechanical handler 177. It should be appreciated that the extending arm 175 can include telescoping sections and/or hinged sections that are electromechanically and/or pneumatically manipulated and controlled. It should also be appreciated that the handler can include clamps, spreaders, electromagnets, and other mechanical means of mechanically gripping and releasing objects.

Also included in the work cell 100 is a processing station 140. The processing station 140 can include preheating elements 127, heated wells 119, lids 123, A control room 102 containing computer control system 150, can operate from an observation area 106 and provide access 108 to the work cell 100. A monitoring, control and material loading station 160 can also be co-located with the work cell 100. Neither the control room nor material loading station should be located with/within the work cell 100 in order to minimize human contact with chemicals or mechanical operations within the work cell 100. Raw material (e.g., unprocessed mineral) access will preferably be provided to the work cell 100 utilizing security-controlled gates 142. The security controlled gates 142 can serve as in and out gateways to the work cell 100 for the provision of raw materials and the receipt of processed minerals. The gateways 112, 122 can be manipulated to open and close utilizing security keypads 112, or the like (e.g., password entry, biometric authentication, etc.). Video monitoring equipment 116 installed inside and outside the work cell 100 can provide additional security and management data to qualified users. Short conveyances, e.g., roller-based countertops 132 and/or belt-driven conveyors, can be used to move materials into and out of the work cell 100. An entry door 118 into the work cell 100 can be secured via the control room facility 106.

A dumping station 180 and storage/holding racks 105, 115 can also be included in the work cell 100. The dumping station 180 can include shelf space for resting crucibles. A drain 183 can collect discarded separating agent and mineral by-product and transport the waste to steel barrels. Fifty gallon hazardous waste barrels 190 can be used to collect and discard of hazardous chemicals such as sodium hydroxide. A robotic pourer 185 can be used in association with the dumping station 180. The robotic pourer 185 can relieve the larger robotic system 170 by causing handling hardware 187 to grab, pour, and rest crucibles 120 at the dumping station 180.

Storage and holding racks 105 and 115 can be conveniently provided within a work cell 100 to provide workspace for the robotic system 170. The racks 105 and 115 can store crucibles 120 and baskets 130 during operation. The processing station 140 can include at least one heating element 127 and more than one processing well 119. The lids 127 can be electromechanically or pneumatically controlled to separately open and close the processing wells 120. The monitoring, control and material loading station 160 will also preferably be located opposite the system 140, adjacent the processing station 140. Location of the monitoring, control and material loading station 160 will more practically enable processing agent to be automatically loaded into the processing system 140.

Figure 2:
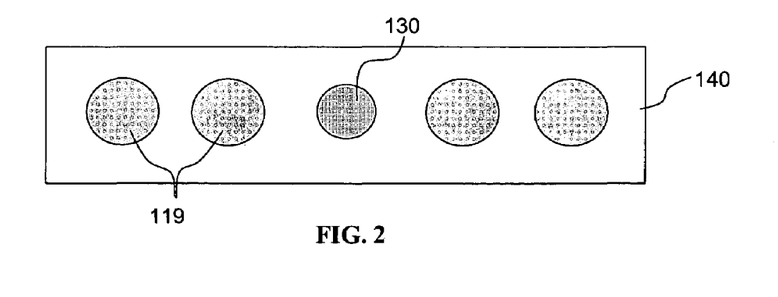
FIG. 2 illustrates a top view of a processing station in accordance with a feature of the present invention.
Figure 3:
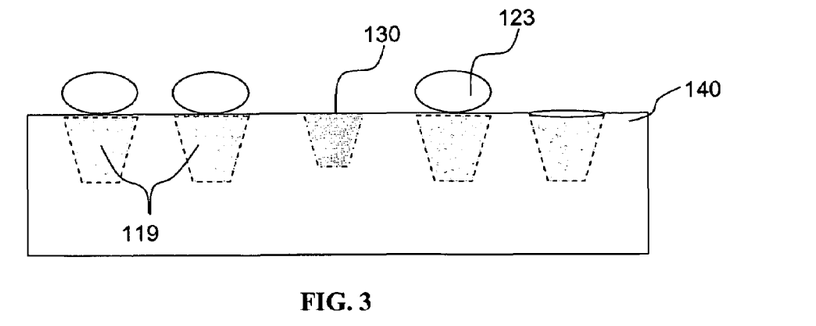
FIG. 3 illustrates a front view of a processing station in accordance with another feature of the present invention.
Figure 4:
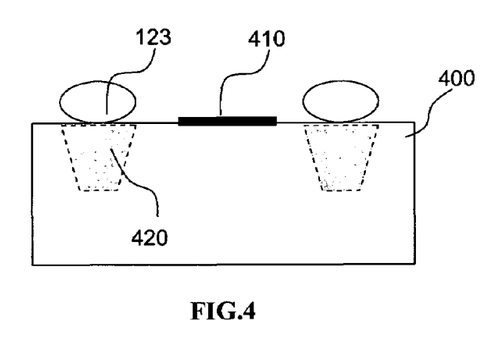
FIG. 4 illustrates a front view of a processing station in accordance with yet another feature of the present invention.
Figure 5:
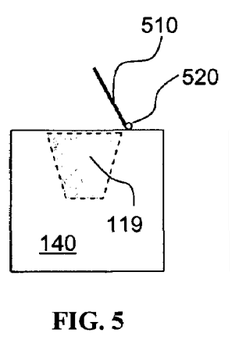
FIG. 5 illustrates a side view of processing station including a lid in accordance with a feature of the present invention.
Figure 6:
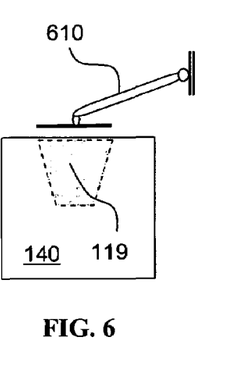
FIG. 6 illustrates a side view of processing station including a lid and robotic lid operator in accordance with a feature of the present invention.

Referring to FIG. 2, an illustration of larger-scaled processing system 140 is shown. The Figure shows four processing wells 119 and one pre-heating section 127. The present inventor believes that the one-four configuration provides adequate capacity to mineral processing enterprises. FIG. 3 illustrated a side view of the processing system 140. As seen in the Figure, the preheating element 127 can be provided in the form of a well that is slightly smaller than processing wells 119. It should be appreciated that tapering of the walls for each well 119 can facilitate crucible and basket loading (as will be discussed with FIGS. 15–16. FIG. 4 illustrates an embodiment where smaller-scaled operations can be executed using a two-well 420 processing system 400. Also shown in FIG. 4, the preheating element can be provided in the form of a hot surface or hot plate 410 rather than as a well. FIGS. 5 and 6 illustrate lid operation. FIG. 5 illustrates an automated lid 510 mechanically attached 520 to the processing system 140. The lid can automatically be caused to close over the well 119 during processing. FIG. 6 illustrates a lid control assembly 610 that is separate from the processing station 140.

Figure 7:
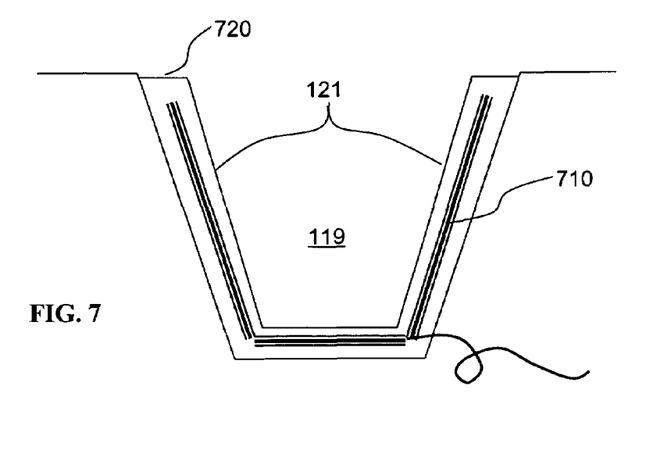
FIG. 7 illustrates a side view of processing well having an integrated heating element in accordance with a feature of the present invention.

FIG. 7 illustrates close-up detail of the element comprising a well 119. The wall of the well 119 is shown to be tapered 121. Tapering can facilitate easier placement of crucibles 120 and baskets 130 by robotic equipment 170; although, it should be appreciated that the well can be designed with a straight cylindrical wall without departing from the spirit of the present invention. A heating element 710 is also shown in FIG. 7. The heating element 710 should be capable of heating contents in the well 119 to temperatures up to and exceeding 500° C. Also shown in FIG. 7 is a rim 720 defined within the surface of the processing system 140. The rim 720 can be provided to accommodate lids used in the system. A rim 720 as shown can improve any seal formed between the well 119 and the lid 123.

Figure 8:
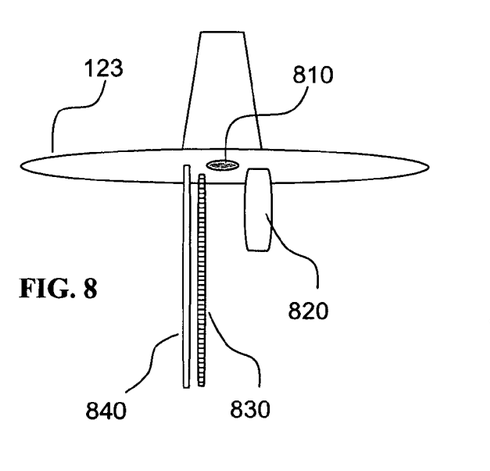
FIG. 8 illustrates a bottom-side view of a lid including integrated measurement transducers, a vent and a material supply port in accordance with features of the present invention.
Figure 9:
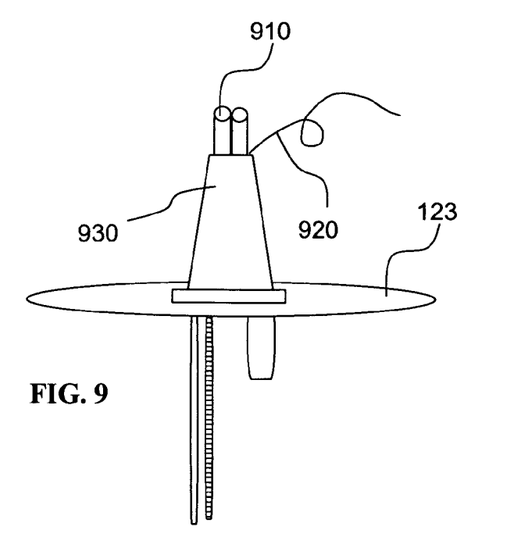
FIG. 9 illustrates a top-side view of a lid including integrated measurement transducers, a vent and a material supply port in accordance with features of the present invention, and also showing tubing and wiring locations in association with the lid.
Figure 10:
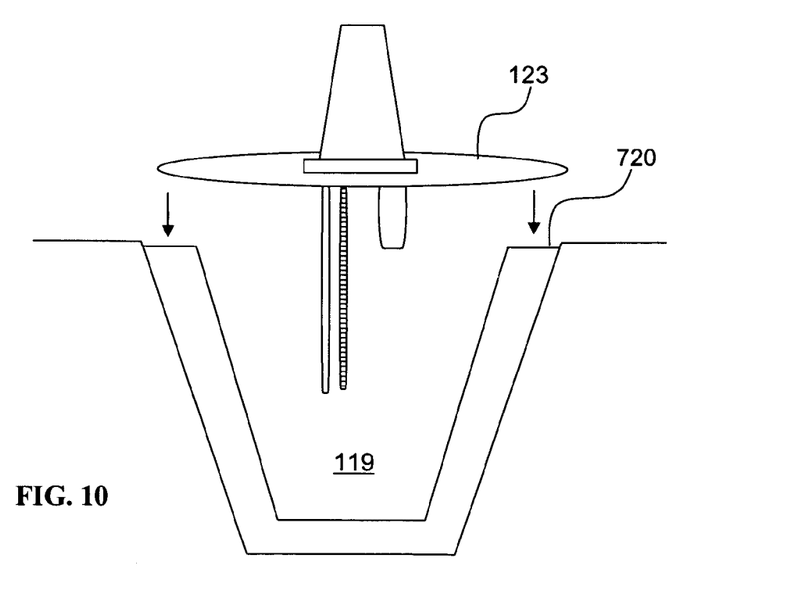
FIG. 10 illustrates a side view of processing well and ideal placement of the lid in accordance with a feature of the present invention.

A lid in accordance to an embodiment of the present invention is shown in FIG. 8. As shown in FIG. 8, the lid 123 can include a vent 810, chemical replenishment port 820, a thermometer 830, and a liquid level sensor 840. A top-side view of the lid 123 is also shown in FIG. 9. As can be seen from FIG. 9, tubing 910 and wiring 920 can be incorporating within lid 123 coupler 930. As shown in FIG. 10, the lid 123 can fit within the rim 720 defined within the well's 119 surface.

Figure 11:
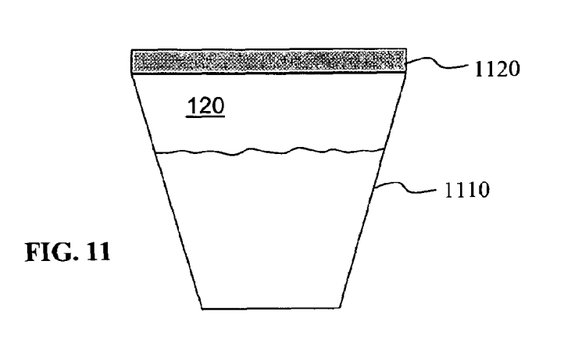
FIGS. 11–13 illustrate side views of crucible designs in accordance with features of the present invention.
Figure 12:
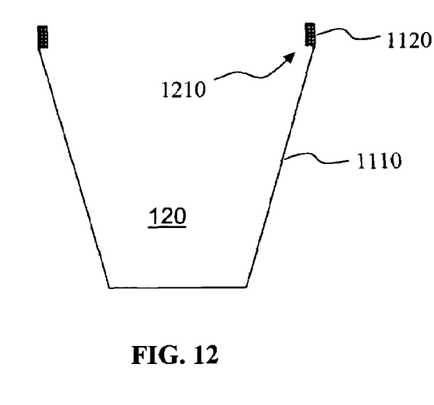
Figure 13:
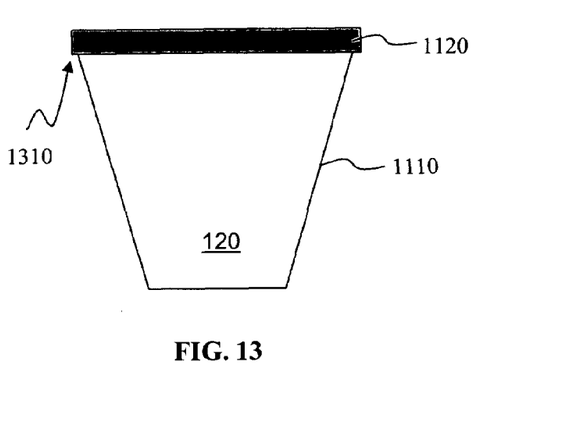

Referring to FIG. 11–13, design features for a crucible 120 are shown; although it should be appreciated that the illustrated design is not meant to operate as a limitation as the skilled can appreciate that other crucible designs adapted for robotic interface can be developed without departing from the scope and spirit of the present invention. FIG. 11 shows the container portion 1110 and the rim 1120 of the crucible 120. FIG. 12 illustrated the crucible 120 wherein the rim 1120 is attached to the container portion 1110 such that an inner rim 1210 is formed therein. The inner rim 1210 allows a robotic spreader to enter the mouth of the crucible 120 and expand until the robotic spreader catches the lid for transport. FIG. 13 also illustrates a crucible 120; however in this case an outer rim 1310 is formed between the container portion 1110 and the rim 1120 just outside of the container wall as shown by arrow 1310. The metal alloy selected for use in manufacturing crucibles 120 for use with the present system should be appropriate to withstand the caustic agents utilized to process raw materials in high temperature environments. Stainless steel is commonly used for hot baths, reservoirs and equipment associated with mineral processing. The present inventor favors the use of Inconel for crucible material as Inconel can withstand environments common to mineral processing environments; although it can be appreciated that other high temperature withstanding material can also be used.

Figure 14:
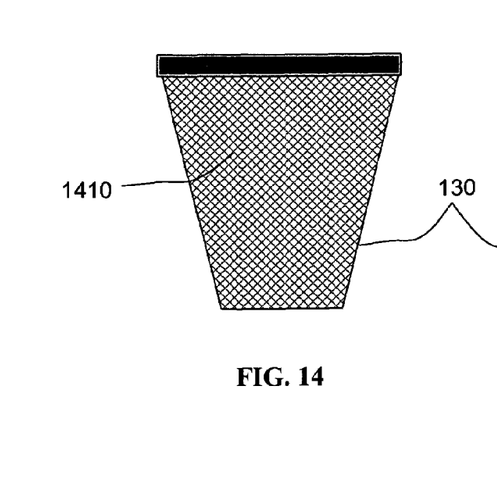
FIGS. 14–15 illustrate side views of mineral basket designs in accordance with features of the present invention.
Figure 15:
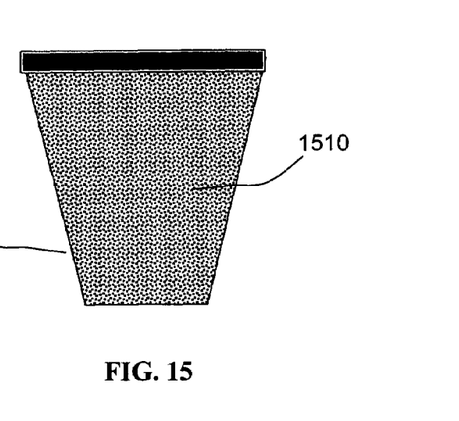

FIGS. 14 and 15 illustrate basket 130 designs. As shown in FIG. 14, the basket 130 is formed of woven metal alloy 1410. FIG. 15 illustrates a basket wherein the metallic alloy making up the body of the basket 130 is perforated 1510 as shown. The metal alloy selected for use in manufacturing baskets 130 should also be appropriate to withstand the caustic agents utilized to process raw materials in high temperature environments. Although stainless steel is commonly used for baskets 130, the present inventor also favors the use of Inconel for basket material because it can stand up to environments commonly found in mineral processing.

Figure 16:
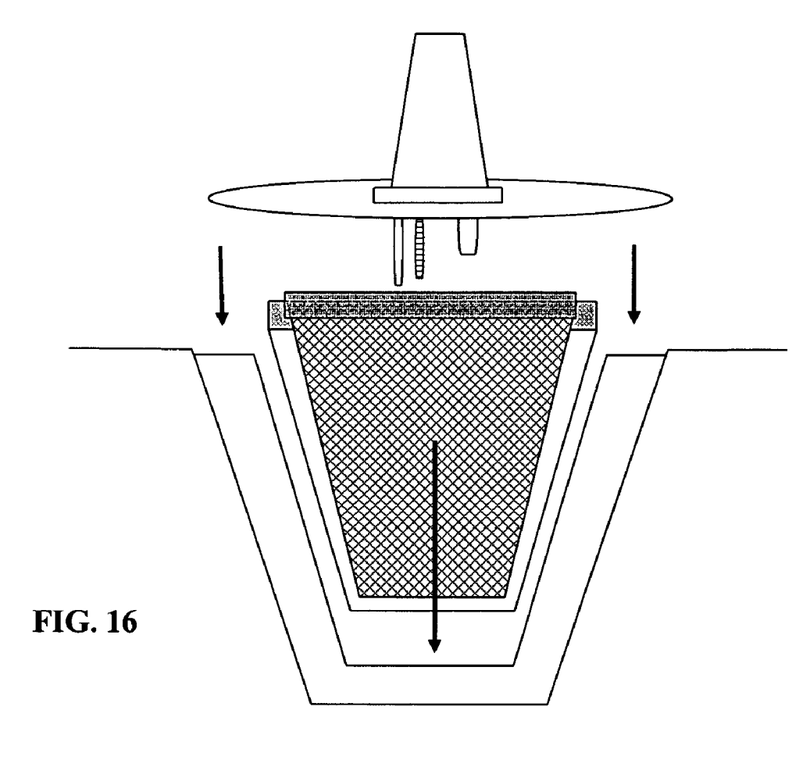
FIG. 16 illustrates hardware components associated with mineral processing within a processing well in accordance with features of the present invention.
Figure 17:
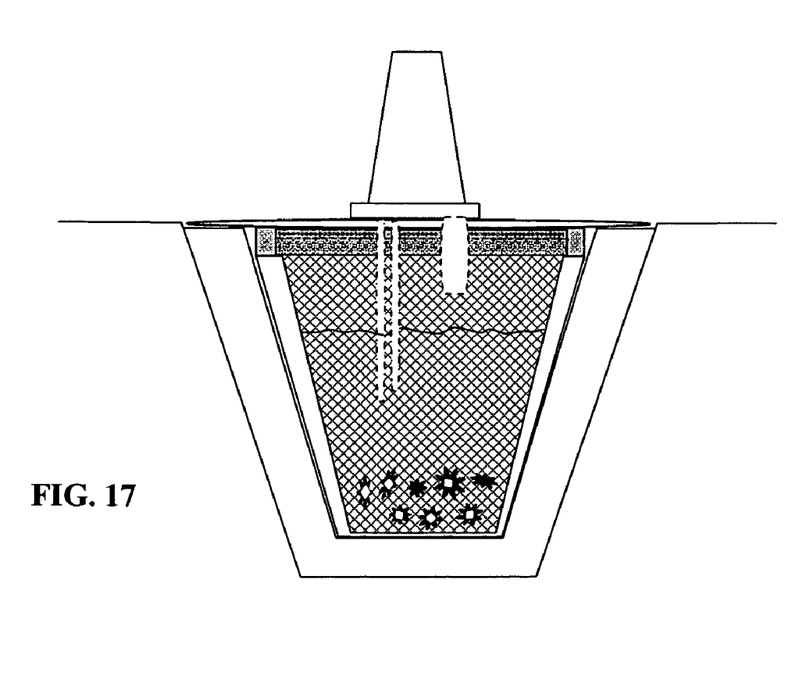
FIG. 17 illustrates hardware components and an exemplary showing of mineral and separating agent contained in the system and undergoing processing in accordance with features of the present invention.

FIG. 16 illustrates all the components utilized during operation of the processing station 140. The well, crucible, basket and lid are illustrated. During use, a crucible is placed into the well. Afterwards, a basket containing raw mineral matter and debris is held within the basket. A lid including monitoring transducers pellet loading and ventilation is also shown prepared to be lowered on the well contents. As shown in FIG. 17, the crucible, basket and lid all fit well within the well during mineral processing.

Figure 18:
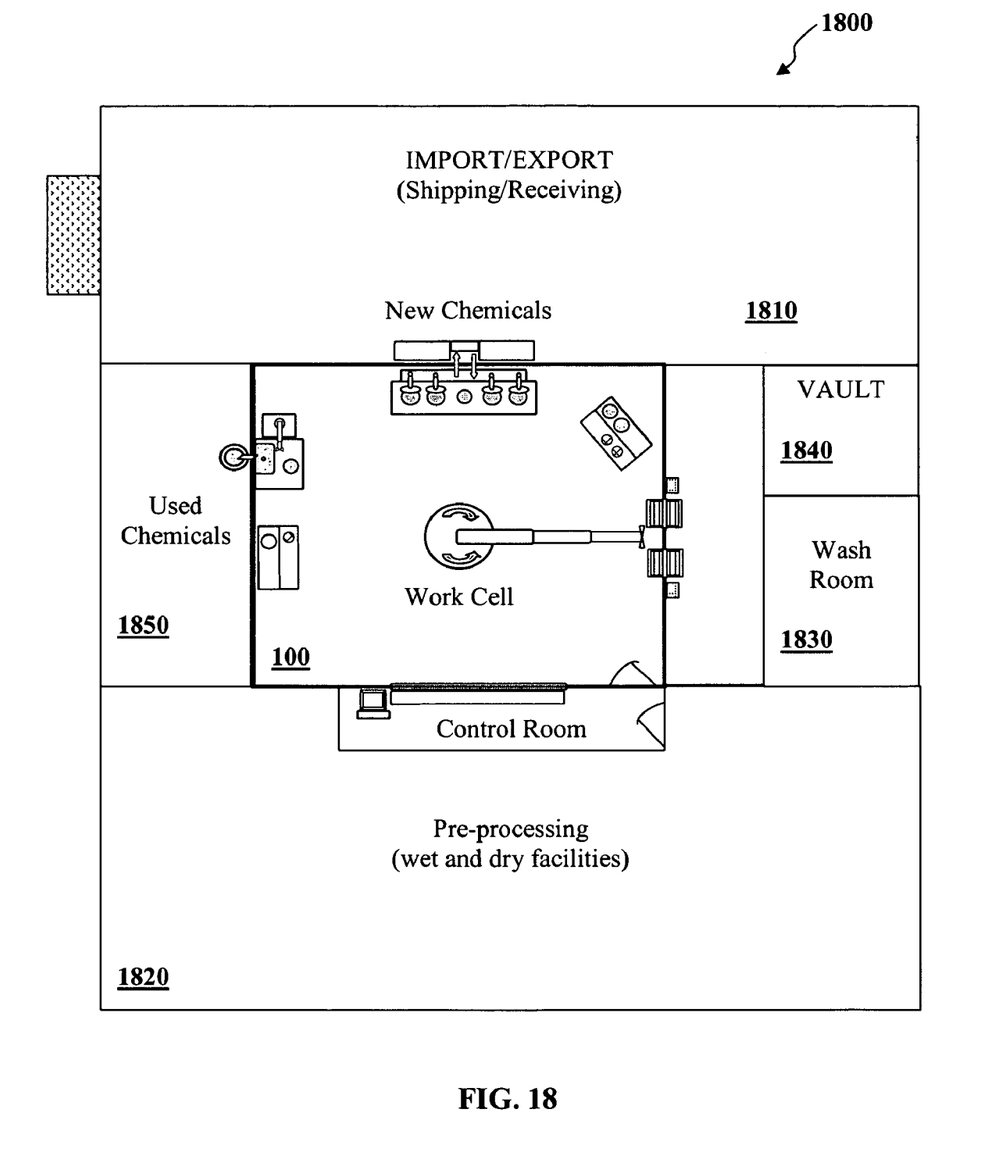
FIG. 18 is an architectural view that is exemplary of an enterprise and its components that can integrate a work cell in accordance with features the present invention.

Referring to FIG. 18, an expanded view of supporting infrastructure 1800 of an enterprise incorporating a work cell 100 in accordance with the teaching of the present invention is shown. It should be appreciated that actual work cell layout and supporting infrastructure 1800 can be provided in different architectural layouts. The layout illustrated in FIG. 18 is only exemplary of how an enterprise may be configured to accommodate a work cell.

A typical enterprise will include a work cell 100, an import/export facility 1810, a pre- and post-processing room 1820, a wash room 1830, a mineral vault 1840 and a used chemical facility 1850. It should be appreciated that most equipment and furnishing contained within the work cell will be provided to stand up to chemical and mechanical use. Stainless steel is preferred for use as surfaces of equipment, furnishings (e.g., shelves) and entry/exit hardware.

Figure 19:
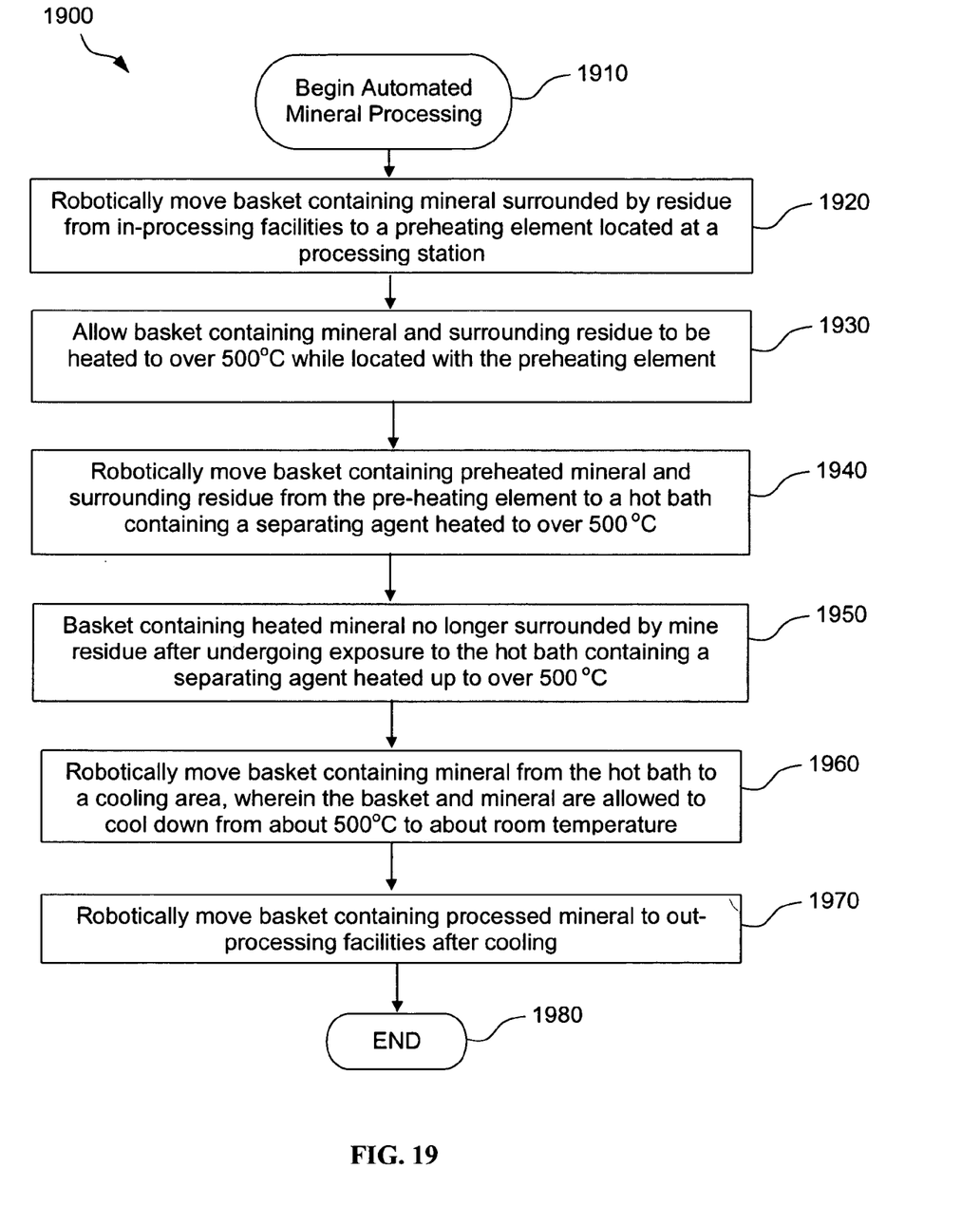
FIGS. 19–21 illustrate flow diagrams for methods of carrying out objectives of the present invention.

Referring to FIG. 19, methods steps 1900 for processing mineral in accordance with features of the present invention are shown. As shown in block 1910, the automated mineral processing procedure is begun. In step 1920, a basket containing mineral surrounded by mine residue is robotically moved from in-processing facilities to a preheating element located at a processing station. In step 1930 the basket containing mineral and surrounding residue is heated up to about 500° C. while located with the pre-heating element. In step 1940, the basket containing preheated mineral and surrounding mine residue is robotically moved from pre-heating to a hot bath containing a separating agent heated to over 500° C. In step 1950, the basket containing heated mineral is no longer surrounded by mine residue after undergoing exposure to the hot bath containing separating agent heated to over 500° C., and the basket is robotically moved to a cooling area as shown in step 1960, wherein the basket and mineral are allowed to cool down (preferably to room temperature). In step 1970, the basket containing processed mineral is robotically moved to out-processing facilities after cooling. The process then terminates at step 1980. It should be appreciated that the process is of course repeated with the introduction of new baskets to the system. The system can also be involved in the processing of several baskets concurrently.

Figure 20:
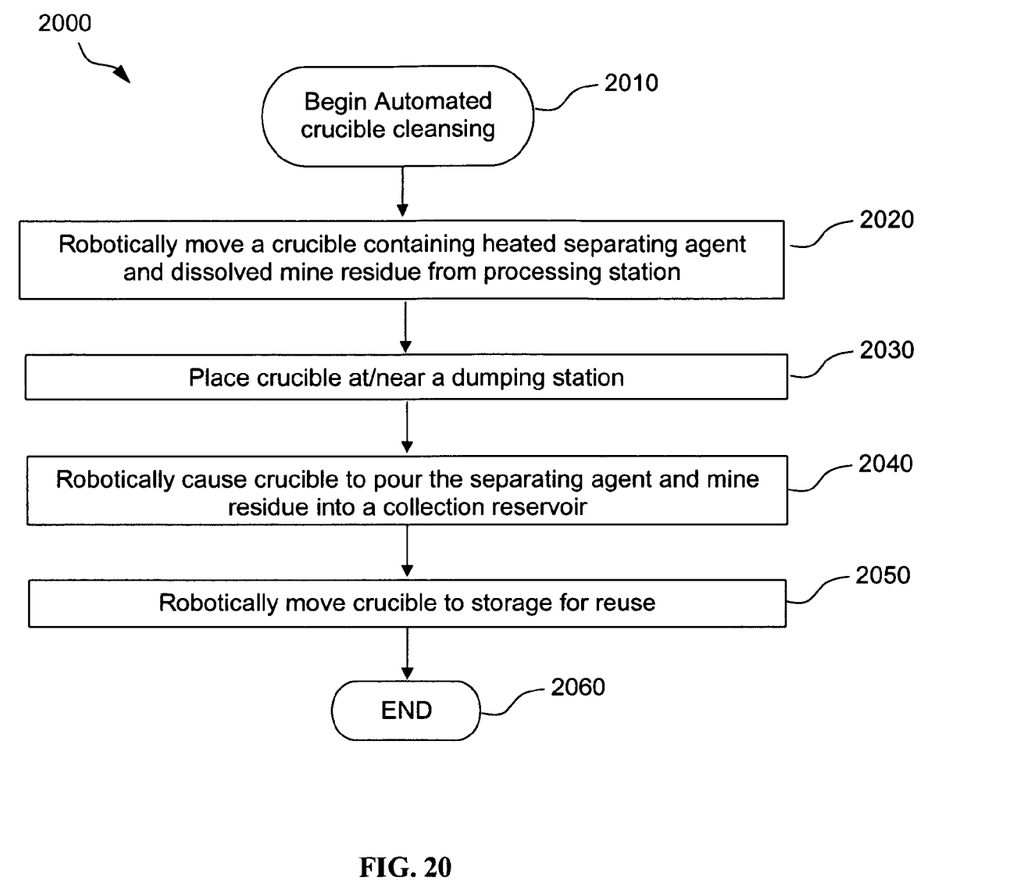

Referring to FIG. 20, a process of automating crucible cleansing 2000 is shown. The process begins at step 2010. In step 2020, a crucible containing heated separating agent and dissolved mine residue is robotically moved from the processing station. As shown in step 2030, the crucible is placed at/near a dumping station. In step 2040, the crucible is robotically manipulated so as to pour the separating agent and mine residue into a collection reservoir. At step 2050, the crucible is robotically moved to storage for re-use. The process terminates at step 2060.

Again, it should be appreciated that the process can be repeated with the processing of new baskets to the system, and thus the use of crucibles each time a basket is processed. The system can be involved in the processing of several baskets and crucibles concurrently.

Figure 21:
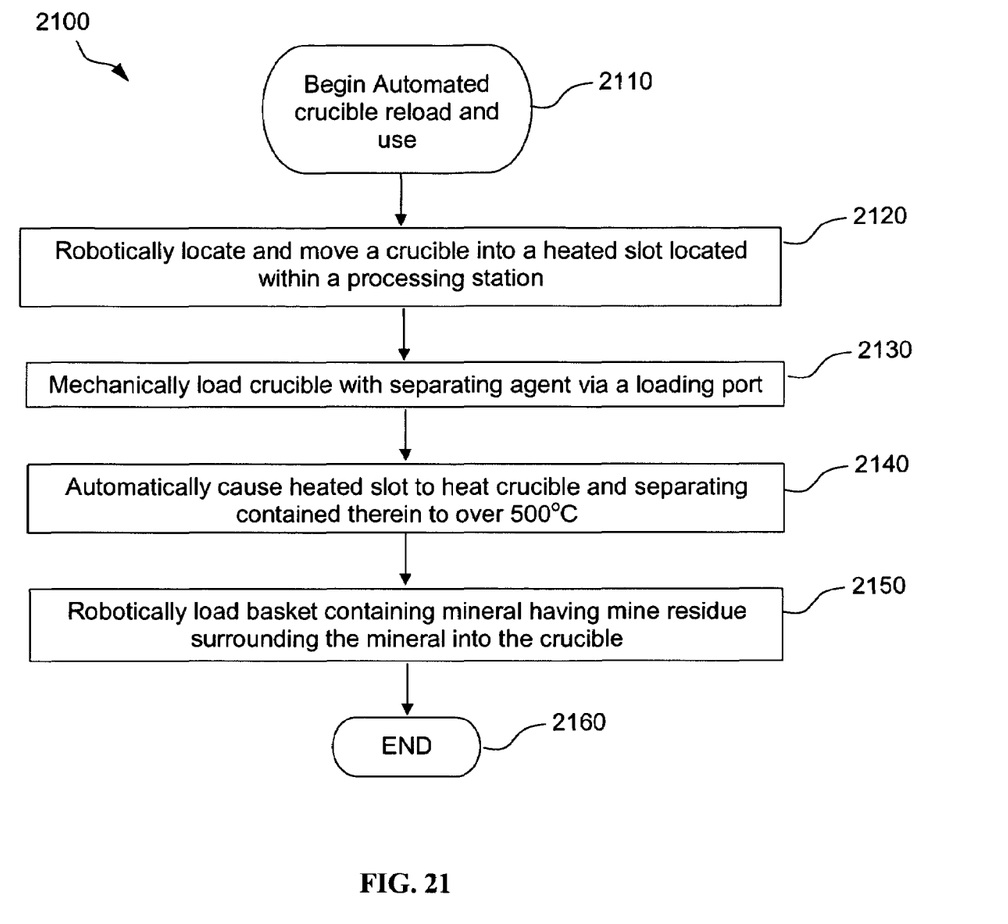

Referring to FIG. 21, a process of reloading crucibles for use 2100 is illustrated. The process begins at step 2110. At step 2120 a crucible is robotically moved into a heated slot (e.g., well) located within a processing station. At step 2130, separating agent is mechanically (and automatically) loaded into the crucible via loading port. It should be appreciated that the loading port can take on several different forms.

The system described herein provides for loading through a cover or lid. It should be appreciated that the systems described herein compliment the methods also described herein, but that the methods described herein are not to be limited by specific hardware configurations. Referring to step 2140, the heated slot (or well) is caused to be heated to over 500° C., which causes the crucible and separating agent contained therein to also heat to over 500° C. In step 2150, a basket containing mineral having mine residue surrounding the mineral is robotically loaded into the crucible for processing. The crucible preparation process ends at step 2160; however, it should be appreciated that the next steps that can be followed were described in FIG. 19, and would then be followed by the steps of FIG. 20.

Additional Mineral Processing Considerations

During operation, sodium hydroxide is introduced into the loading system 180 when a user presents room temperature process wells 120 with sodium hydroxide pellets to the entrance port 125 of the system. When appropriate, the robotic system 170 will move the pot to an available well 120 in the process station 140. The pot is placed in a well 120 of the processing station 140 and a cover 123 is lowered over the 120 and its contents (e.g., crucible and basket). This cover 123 should prevent splashing of the separating agent as it is heated. The processing station 140 will preferably only turn on heating elements associated with the processing system 140 if the system has decided, using measurement transducers (830, 840) integrated within the lid 123, that it is safe and the material is melted.

When the material has melted, the processing system 140 will raise the cover 123 on each well 120 and lower a basket into the melted medium. A lid 123 will be lowered over the pot to monitor the process. When the process in the pot has finished, the process lid will be raised from the pot and the process basket will be removed and placed on an output port for cooling. The process pot full of hot spent sodium hydroxide will be carefully raised from the heater assembly and the heaters can be shut off. The raised pot can be moved by the system to the empty station. The empty station can be instructed to grab the hot pot, raise it up and pour out the liquid into the recovery container. The system can accommodate a number of containers but for this discussion, we will assume a 55-gallon drum is the recovery container.

The container is placed in its appropriate position by a user and a safety shield lowered over the top of the drum. This shield can be lowered by the user by activating two buttons at the same time. The two-button operation is a safety to insure that the user wanted to perform this operation. If only one button is activated in a 2-button configuration, then the system will not lower the shield and the process can stop. It should be noted that only the caustic removal process would stop. The processing of the product can continue until the system has determined that it can no longer accept pots for processing. Assuming the safety shield has been lowered and the system confirms this, the system can return to normal processing.

The automated system can look for a high level in the recovery drum and if not found, the system will pour the hot liquid into the recovery drum. The system can also time and date stamp all additions to the recovery drum for later inspection if needed. After the pot has been emptied of the hot liquid, the pot can be moved to a wash station.

The pot can be cooled and when cool, washed of any remaining sodium hydroxide that remains on the inside or outside of the pot. The pot can be dried and placed on the exit port of the system for return and refilling by the customer.

During the operation the system can monitor the number of pours into the recovery and if the number exceeded a maximum or the drum level sensor detects a high level in the drum, the system can not pour any more liquid into the drum. The system can signal the operator that the drum needs to be changed and will keep any liquid in pots at temperature until the drum has been changed. Changing the drum can be automated as a simple matter of pushing the two buttons. A safety shield can rise and the drum may be changed. The above is a description as to how the invention can be programmed and automated to handle the hot caustic within the system.

Implementation of the invention can be provided wherein a system can have 8 Inconel process pots allowing the system to provide continuous operation without waiting for the cleaning and processing of the pots. Since there are up to 4 process pots being used at any one time and the system automatically empties the used process material and cleans the used pots before handing them off to the user for refill, an additional 4 pots provide the user with the opportunity to have recharged process pots well in advance of the systems request for them. This allows for 24/7 operations if needed.

During the process, it is very important that the raw product to be brought to the temperature of the process pot to prevent temperature shock to the product. In the invention, the pre-heat station provides this requirement. The system accepts the product pre-loaded in the process basket and moves the basket to the pre-heat station. Here the product and basket is brought to the desired temperature and held there until the system determines that a process pot is ready to accept the basket. The basket is then automatically removed from the preheat chamber and moved to the appropriate process pot for processing. After the product basket has been moved to the process pot, another process basket can be moved to the pre-heat station and the process starts over again.

At the end of the process cycle, the system will move the process basket to the exit station and signal the user that the tray is ready for retrieval. The process pot is then moved to the pot dump station. The process pot is clamped and rotated so the hot liquid can be poured into the recovery tank. The recovery tank has a screen over the top that will recover any product that may be in the liquid. After removal of the liquid and cooling down of the pot, the pot is moved to the wash station within the system and rotated so that the empty cool pot is upside down and cleaned with a power washer. The system provides complete isolation of the system from the wash station to prevent any cross contamination of the system with the wash water. The clean pot is then allowed to completely dry with the help of warm air blown into the pot. After the pot is dry, it is placed into the output area for recovery and refill by the customer.

In order to eliminate any potential damage to personnel, equipment and facilities, the invention can incorporate a $CO_2$ fire suppression system. $CO_2$ suppression heads throughout the system can be linked to a large $CO_2$ bottle. Any sign of a fire within the system can signal the control electronics to immediately shut down the system, flood the unit with the $CO_2$ gas, and sound a local alarm. The system can also send email to alert appropriate personal.

A key optional feature of the invention is the complete protection of the product within the system. When the process tray is presented to the system, a code is entered into a keypad. If required, a tracking code is also can be entered into the keypad. The system will record the codes and verify if a correct code has been entered. If the correct code has been entered, the system will open the input panel, record the code, and provide a time and date stamp for the process basket. During the entire time the process basket is within the system, every move will be tracked and time and date stamped. A complete record of every move the process basket has taken is saved within the system, including every stop the basket makes thought the process, every temperature the basket undergoes thought the process, any process errors that may occur during the process, and the time of completion of the process.

When the process basket has completed its journey through the system, it will be placed at the exit port of the system. At this time, both an audible and visual alarm will alert the user that the basket is ready for retrieval. At this time the user must enter an appropriate code into the system. The system will compare the code and only if it is valid, will the output panel open for product retrieval. The time and date of the retrieval will be recorded and the complete record of the product through the system will be recorded on magnetic tape for review later if required. The data can also be sent to another location over an Ethernet port for complete data safety.

When appropriate, all access panels are secured within the system and may not be removed from the outside. The maintenance door to the system has a key lock for complete security for the product within the system. The key lock can consist of several embodiments: The use of a security badge or biometric instead of a keypad for password entry to the system. The use of a barcode for product tracking. The addition of a stage to move the product into a secure room after processing. This would eliminate the manual step of moving the product from the system to the next step.

As mentioned before, the system has a series of view panels to view the operation of the system. These panels should be constructed of appropriate materials as to provide the clearest viewing and highest level of safety.

As part of the design of the system, multiple backup systems can be incorporated therein for two reasons. The first reason is the high value of the product, and the second reason is the potential hazard presented by the hot, caustic process agent. The system incorporates multiple inputs to the control system. These inputs are constantly monitored during the operation of the system and compared. If there are any differences within the readings that are not normal, the system will alert the operator and take appropriate action. In addition to multiple inputs for the process parameters, additional separate systems with ultimate control can override the control systems in the case of a catastrophic failure.

Easily adjustable alarm limits can be set for every appropriate parameter within the system. The limits can be determined by the user and may be changed as needed. It should be noted that any limit deemed to be a safety issue can be hard coded into the system and may not be changed except by the factory.

Each process pot has two lids. The first lid is closed over the pot when it is heated with a fresh charge. This is a safety feature during the heating of the charge. When the charge is heated and ready for the process tray, the lid is removed and the process pot loaded into the melted charge. A second lid is then lowered over the pot. This lid has a number of functions. One is to monitor the temperature of the liquid within the pot. While external sensors continually monitor the pot, the addition of a process-monitoring sensor insures that the process is proceeding as planned.

All the sensor data can be are recorded for later retrieval. In addition to the temperature sensor, a liquid level sensor is included in the top. During the process cycle, the internal liquid level is monitored and additional process tablets are automatically added if required to maintain fluid level during processing. The third function of the top is to periodically lift the top and the process tray a small amount in the liquid to insure complete product immersion at all times. Finally, the lid can be a vent to the ducting system to vent the pot of any gases during processing.

Because the entire minimal product is not the same size, the invention is supplied with a number of tray separators to separate the product within the process tray. This allows for easier separation of the finished product after processing.

As with all mechanical systems, there will be some normal maintenance. Because of the dangers of moving parts within the system and the hot process medium, all moving parts within the system are interlocked. During maintenance, appropriate codes have to be entered into the system to allow the operation of the system during maintenance operation. These codes should be known only by qualified maintenance personal. Any attempts to enter the system without the appropriate codes will result in the deactivation of the system.

Because the system can track all process trays and process pots, it can determine if it can accept another pot or tray. If a pot or tray is presented to the system and the system has all the elements required, it will not accept another item until it has determined it can process the item.

Because this is an automated system there are a number of decisions to be made in the event of a power failure. The system has to made safe before it can shut down. The system should have a heavy-duty battery backup (UPS) for this purpose. The backup has enough capacity to allow the system to shut down in a safe manner before shutting the entire system down. The UPS also acts as a power conditioner for the electronic systems. In the event of a quick power glitch, the UPS can allow the system to operate without interruption.

As with any automated system, the software should allow the system to come on line from a power shutdown, whether intentional or unintentional. The software will interrogate the system and make the decisions required to provide a safe reliable operating system.

For complete safety to the system and the operators, high volume airflow will be maintained within the process system. This flow will be monitored by the electronics and reported to the operation display. If fluctuations within the system are observed, the system will decide the proper course of action. In the event of a complete air failure the system will complete processing the material within the system but will not allow the introduction of any additional product until the airflow problem has been resolved. In the event that a fire has been detected by the fire suppression system, the airflow will be shut down to prevent loss of the $CO_2$ retardant, and to starve the fire of oxygen.

A system can be adopted to signal the operator the condition of the system by two methods. The first is a light tower on the face of the system. There can be 4 lights on the tower: Green, orange, blue, and red. The orange light suggests that the system is running but some minor error has been detected and should be looked at the earliest convenience. The blue light demonstrates that the system has detected a more serious error and part of the system is not functional. This also means that the remaining part of the system is working and process can continue but at a reduced rate. The red light is a catastrophic failure and all process has stopped. For any of the fault conditions, the control display will indicate the error. A green light on the tower signals that the system is in good standing and ready for a process or product pot. In addition to the light tower, there is a complete status display on the system-operating screen. Above the process pot and product door there are red and green light. If the system is ready to accept either a process pot or product pot, the appropriate green light will be illuminated. If the red light is illuminated the appropriate panel is not ready to accept the pot. When the system is ready to accept a pot, the light will turn to green and the appropriate entry sequence can be entered on the keypad. If the entry sequence is correct the operator will be asked for a lot tracking code if required. If all entries match, the appropriate panel will open and the operator can move the pot into the system. When the pot is in the system, the pot will be detected and the panel will close in a predetermined time.

If another process pot is presented to the system and there are empty process stations available, the system will accept the pot after the appropriate password verification, and move the pot to the empty station for heating of the process material. When the process pot is to temperature, the system will move product tray to the pot, open the first lid, and place the tray into the pot. The second lid will then be lowered over the tray and the process will proceed.

During the processing, the system can monitor the temperature within the processing liquid, the level of the liquid, and occasionally lift the tray a bit to insure fresh liquid is always present on the product. If the system determines that the liquid is low, it can add an appropriate amount to keep the liquid at the proper level.

When the process cycle of an appropriate station has finished, the system will remove the lid from the pot and lift the product from the hot pot. The product tray will be given a small time to drip and then it will be moved to the output station. There is a small amount of forced air to help the product cool. When the product has cooled, the green light over the product exit panel will light and an audible alarm will sound informing the operator that the product is ready to be removed. After the appropriate password is entered at the exit station, the product panel will be raised and the product may be removed. The exit panel will then close after the removal of the product. At the same time, the process pot will be moved to the recycle area of the robotic system. The system can rotate and pour the hot liquid through a safety mesh into the recycle drum. The pot can be stationed at the cool down station and allowed to cool. When cool, the pot can be rotated upside down over the wash area and the pot is power washed and forced air-dried. The pot can then be rotated to the upright position and moved to the pot exit area. The green light above the panel can be illuminated and an audible alarm will sound. The operator may then remove the pot for refilling and return to the system.

The invention claimed is:

1. A mineral processing system that performs product movement and processing within a secured room using robotics and computerized automation, comprising:
    a robotic arm adapted for picking up, carrying, manipulating and releasing at least one crucible or mineral basket;
    a mineral processing station including at least one chemical processing well adapted with at least one thermal transducer and at least one heating element, wherein the chemical processing well can be heated to provide a hot bath of separating agent wherein raw mineral is submersed; and
    at least one computer, said at least one computer for controlling movement of the robotic arm, operating and monitoring the mineral processing station, and controlling access to the secured room.

2. The system of claim 1 wherein said at least one chemical processing well further comprises a cover for containing mineral and separating agent during mineral processing.

3. The system of claim 2 wherein said cover further comprises at least one transducer for monitoring processing operations within the chemical processing well.

4. The system of claim 2 wherein the cover further comprises a separating material delivery port integrated with the cover that can be used to dispense separating material into the chemical processing well.

5. The system of claim 2 wherein the cover further comprises a vent integrated with the cover that can be used to collect harmful vapors emanating from the chemical processing well.

6. The system of claim 1 further comprising a mineral basket, said basket adapted contain mineral during processing and adapted for handling by the robotic arm during transport within the secured room.

7. The system of claim 6, wherein said baskets is made from at least one of Inconel or stainless steel.

8. The system of claim 1 further comprising a crucible, said crucible adapted to contain separating material outside of the chemical processing well prior to placement in the chemical processing well by the robotic arm, within the chemical processing well during mineral processing after placement of the crucible within the mineral processing well by the robotic arm, and after mineral processing when the robotic arm removes the crucible and transports it to a chemical dumping station where the chemical can be dumped from the crucible into the dumping station after manipulation of the crucible by the robotic arm.

9. The system of claim 8, wherein said crucible is made from at least one of Inconel or stainless steel.

10. An automated mineral processing system, comprising:
    a work cell adapted with electronically controlled access;
    a computer-controlled robot located within the work cell and including an arm adapted for providing retrieval, movement, manipulation and release of containers within the work cell;
    a mineral processing station located within the work cell and including at least one chemical processing well adapted with at least one thermal transducer and at least one heating element, wherein the chemical processing well can be heated to provide a hot bath of separating agent wherein raw mineral is submersed;

a chemical dumping station located within the work cell wherein used separating agent and residual mineral waste is disposed; and at least one computer for controlling movement of the robotic arm, operation and monitoring of the mineral processing station, and access to the work cell.

11. The system of claim 10 wherein said at least one chemical processing well further comprises a cover for containing mineral and separating agent during mineral processing.

12. The system of claim 11 wherein said cover further comprises at least one transducer for monitoring processing operations within the chemical processing well.

13. The system of claim 11 wherein the cover further comprises a separating material delivery port integrated with the cover that can be used to dispense separating material into the chemical processing well.

14. The system of claim 11 wherein the cover further comprises a vent integrated with the cover that can be used to collect harmful vapors emanating from the chemical processing well.

15. The system of claim 10 further comprising a mineral basket, said basket adapted contain mineral during processing and adapted for handling by the arm during transport within the secured room.

16. The system of claim 15, wherein said baskets is made from at least one of Inconel or stainless steel.

17. A method of processing minerals using an automated system including a work cell secured by electronically controlled entry/exit and containing a computer-controlled robot, a preheating element, and a hot bath associated with a heated processing station, said method comprising the steps of:

using the robot to move a basket containing mineral surrounded by residue from the electronically controlled entry/exit to the preheating element wherein the basket containing mineral and surrounding residue is heated to over 500° C.;

using the robot to move the basket containing mineral surrounded by residue from the pre-heating element into the hot bath, said hot bath containing a separating agent already heated to over 500° C.; wherein the basket containing heated mineral remains until the mineral is no longer surrounded by mine residue;

using the robot to move the basket containing mineral no longer surrounded by residue from the hot bath to a cooling area where the basket and mineral are allowed to cool down; and using the robot to move the basket containing mineral no longer surrounded by residue from the cooling area to the electronically controlled entry/exit.

18. The method of claim 17, wherein said system includes a chemical dumping station and the hot bath is contained within a crucible that is removable from a well formed in the heated processing station, said method further comprising the steps of:

using the robot to remove the crucible from a well located in the heated processing station and to move it to a dumping station;

using the robot to manipulate the crucible over the dumping station to thereby empty the separating agent into a collection reservoir associated with the dumping station.

19. The method of claim 18, further comprising the step of using the robot to move the crucible from the dumping station to storage.

20. The method of claim 18, further comprising the steps of:

using the robot to move the crucible from the dumping station into a heated well located within the heated processing station;

automatically loading separating agent into the crucible via loading port associated with the heated processing station;

heating the crucible and separating agent to over 500° C.; and repeating the steps of claim 18.

* * * * *